United States Patent [19]

Eastep

[11] Patent Number: 4,713,525
[45] Date of Patent: Dec. 15, 1987

[54] MICROCOMPUTER CONTROLLED INSTANT ELECTRIC WATER HEATING AND DELIVERY SYSTEM

[75] Inventor: Calvin W. Eastep, Houston, Tex.

[73] Assignee: Kowah, Inc., Houston, Tex.

[21] Appl. No.: 888,400

[22] Filed: Jul. 23, 1986

[51] Int. Cl.⁴ .......................... H05B 1/02; F24H 1/10; G05D 23/00

[52] U.S. Cl. .................................... 219/308; 219/298; 219/306; 219/309; 219/321; 219/328; 219/330; 219/484; 219/486; 237/8 R

[58] Field of Search .............................. 219/296–299, 219/306–309, 328, 330, 331, 320, 321, 483, 484, 486, 487; 237/8; 364/505

[56] References Cited

U.S. PATENT DOCUMENTS

| | | | |
|---|---|---|---|
| 3,596,588 | 8/1971 | Moss | 219/308 X |
| 4,337,388 | 6/1982 | July | 219/328 X |
| 4,410,791 | 10/1983 | Eastep | 219/298 X |
| 4,638,147 | 1/1987 | Dytch et al. | 219/308 |

FOREIGN PATENT DOCUMENTS

| | | | |
|---|---|---|---|
| 138171 | 4/1985 | European Pat. Off. | 219/308 |
| 3306807 | 8/1984 | Fed. Rep. of Germany | 219/308 |
| 3304322 | 8/1984 | Fed. Rep. of Germany | 219/309 |
| 2007046 | 5/1979 | United Kingdom | 219/298 |
| 2102164 | 1/1983 | United Kingdom | 219/308 |
| 2115912 | 9/1983 | United Kingdom | 219/296 |
| 2140990 | 12/1984 | United Kingdom | 219/321 |
| 2147980 | 5/1985 | United Kingdom | 219/308 |
| 2150716 | 7/1985 | United Kingdom | 219/308 |

OTHER PUBLICATIONS

"Instant Hot Water Flows from Cold Water Pipe", Popular Science, Jul. 1961, pp. 44, 45, 46 and 182.

Primary Examiner—Anthony Bartis
Attorney, Agent, or Firm—Brady, O'Boyle & Gates

[57] ABSTRACT

A microcomputer operates in response to user selected flow rate and water temperature inputs to calculate the temperature difference between the cold water input and the hot water delivery output from a multisection continuous flow electric water heater wherein a plurality of electric resistance heater elements contained therein provide 5° F. temperature increase increments each, while one heater element is comprised of three sub-sections, two of which provide 2° F. temperature increments and one section provides a 1° F. temperature increase increment. The microcomputer constantly monitors the water temperature difference and controls activation of the required heater elements or element sub-sections to heat the water to a selected delivery temperature with an output solenoid being additionally controlled to provide delivery at a selected flow rate. The microcomputer furthermore displays the delivered water temperature and in the event non-heated water is desired, ignores any selected temperature commands and controls only the flow rate. Should the user select an invalid set of flow and temperature values, the microcomputer causes system operation to occur at the closest possible allowable conditions of flow rate and temperature.

6 Claims, 5 Drawing Figures

MICROCOMPUTER CONTROLLED INSTANT ELECTRIC WATER HEATING AND DELIVERY SYSTEM

BACKGROUND OF THE INVENTION

This invention relates generally to electric water heaters and more particularly to a water heater which is controlled by a microcomputer.

In U.S. Pat. No. 4,410,791, entitled, "Electric Instant Water Heater", which issued to Calvin W. Eastep, the present inventor on Oct. 18, 1983, there is disclosed an electric instant water heater mounted in a cold water line in proximity to a water tap. The heater is comprised of an elongated core molded from a ceramic material and having a rectangular cross section water flow passage extending therethrough from a circular inlet connected to a water supply pipe to a circular output connected to a water tap which may be, for example, a faucet for a tub or sink or a shower head. A plurality of parallel spaced thin rectangular electrical resistance plates are positioned within the passage and upon being energized from an external power source, causes the water from the cold water line to be heated as it flows in a serpentine travel path through the heater by coming in contact with the respective resistance plates.

Accordingly, it is an object of the present invention to provide an improvement in electric instant water heating systems It is another object of the invention to provide an instant water heater system which is controlled to provide selective flow rates and delivery temperatures.

It is a further object of the invention to provide computerized control of an instant water heater system providing selective flow rates and delivery temperatures.

SUMMARY

Briefly, the foregoing and other objects are accomplished by a computerized water heater control system which operates in response to a plurality of user selected flow rates and water temperatures. The difference between the input water temperature and the output water temperature is computed, whereupon a set of resistance heating elements located in a serpentine flow water housing are energized in 1° F., 2° F. and 5° F. increments until the required water temperature is delivered to a solenoid controlled water tap. The delivered water temperature is, moreover, continuouly monitored by the computer and displayed on a control panel including sets of push button switches and lights for selecting flow rate and delivery temperature, with the flow rate being effected through a multiple position water tap solenoid valve controlled by the minicomputer.

BRIEF DESCRIPTION OF THE DRAWINGS

The objects of the present invention and the attendant advantages thereof will become more readily apparent with reference to the following drawings wherein.

DESCRIPTION OF THE PREFERRED EMBODIMENT

Figure 1:
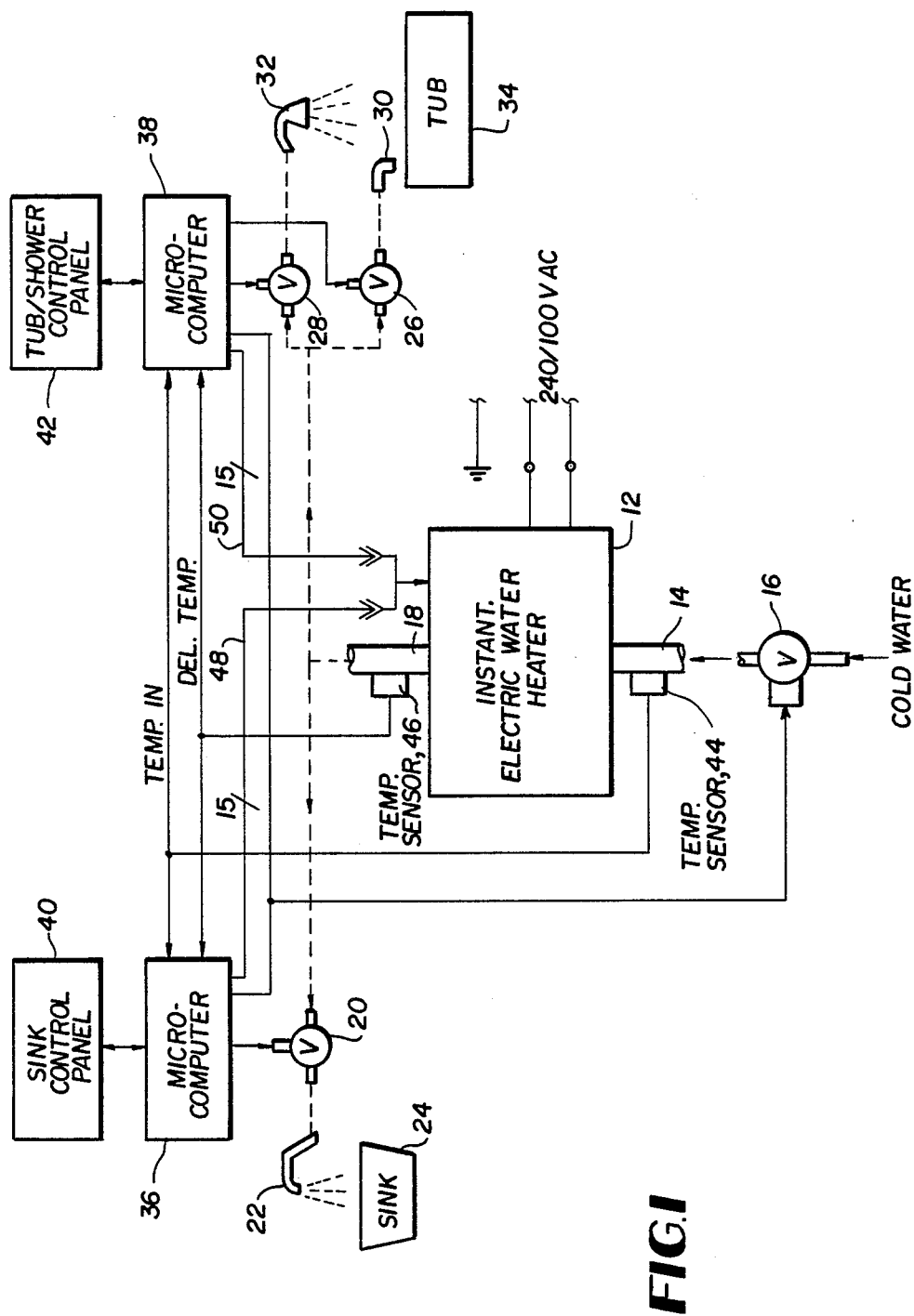
FIG. 1 is an electrical mechanical block diagram illustrative of the preferred embodiment of the invention.

Referring now to the drawings and more particularly to FIG. 1, reference numeral 10 denotes an electric instant hot water heater of the type shown and described in the above referenced U.S. Pat. No. 4,410,791 and is specifically incorporated herein by reference. The heater 10 includes a housing 12 within which is located a set of selectively energized heater elements schematically shown in FIG. 2 and which will be referred to subsequently. The heater housing 12 includes an inlet water pipe 14 to which is connected a solenoid operated input cut-off valve 16. A source of cold water, not shown, is connected to the valve 16 which when operated feeds water into the hot water heater 10. An output water line 18 is connected to the housing 12 where it is shown in FIG. 1 branching to a single solenoid output valve 20 coupled to a water tap in the form of a faucet 22 which is adapted to feed water into a sink 24.

The other branch is coupled in parallel to a pair of like solenoid operated output valves 26 and 28 which are adapted to individually feed water to a pair of water taps comprising a faucet 30 and a shower head 32 utilized in connection with a tub 34.

A pair of microcomputers 36 and 38 are further shown in FIG. 1 which are respectively coupled to a sink control panel 40 and a tub/shower control panel 42. The two control panels 40 and 42 are further shown in FIGS. 4 and 5 and permit the user to preselect a desired flow rate and delivery temperature of water to the sink 24 and/or the tub 34, with the microcomputer 36 controlling the water tap delivery solenoid valve 20 while the microcomputer 38 controls the delivery solenoid valves 26 and 28 for the faucet 30 and shower head 32, respectively. Additionally, a pair of analog temperature sensors 44 and 46 are respectively located on the input and output side of the water heater, by being mounted, for example, on the inlet pipe 14 and the output delivery pipe 18, and operate to feed electrical analog input signals of the ambient and delivered water temperatures, respectively, to both microcomputers 36 and 38.

The embodiment of the invention shown in FIG. 1 discloses two microcomputers 36 and 38 for use with separate control panels 40 and 42. This is done merely for the sake of illustration and simplicity, since a single microcomputer could, when desired, be utilized in connection with both control panels to control flow rate and water temperature to the proper delivery solenoid valve.

Figure 2:
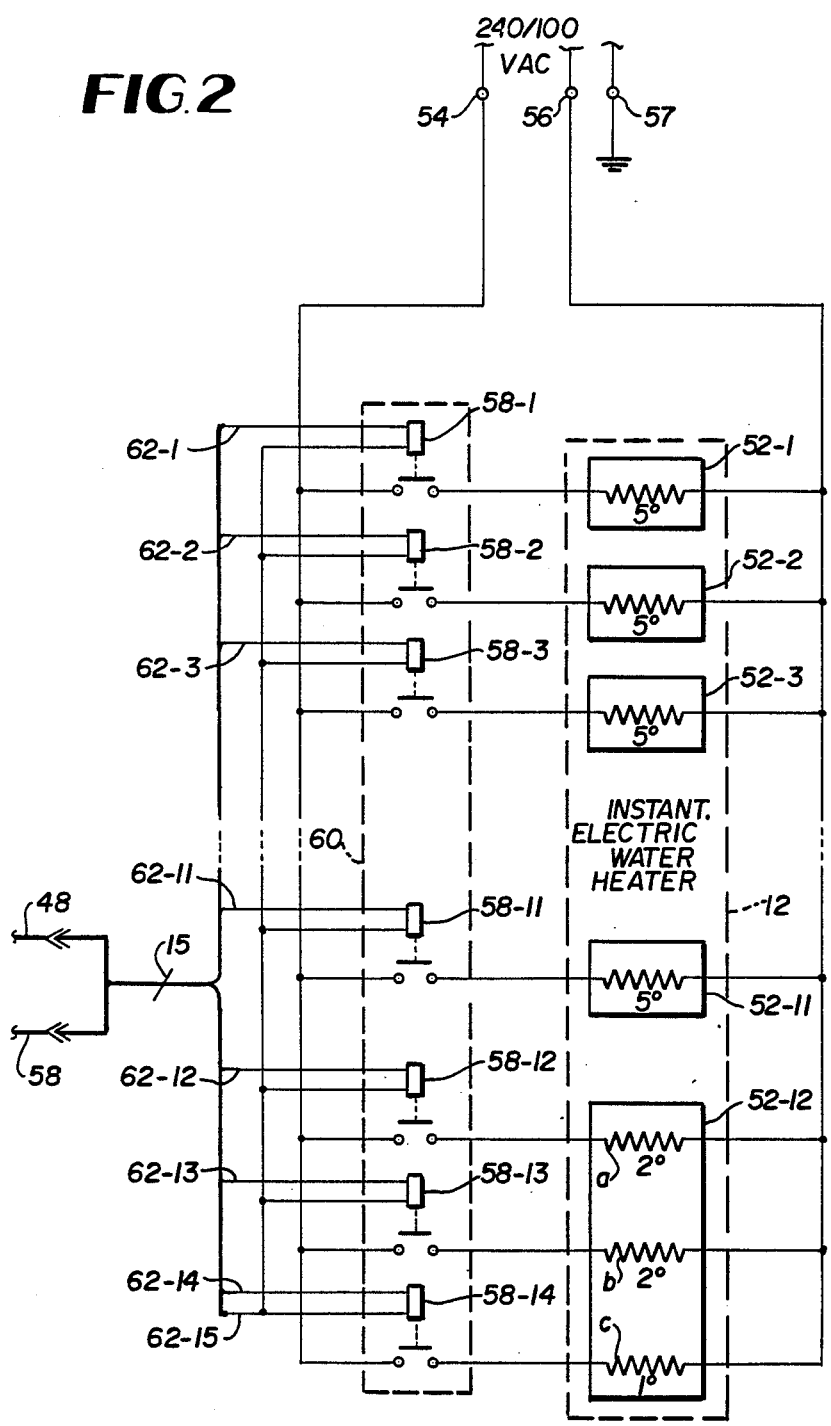
FIG. 2 is an electrical block diagram illustrative of the circuit elements used for varying the water temperature of the instant hot water heater shown in FIG. 1.

Each microcomputer 36 and 38, moreover, in addition to being coupled to the solenoid control valves 16, 20, 26 and 28, includes a fifteen wire cable 48 and 50 which commonly connect into the hot water heater 10 for controlling a set of relays, as shown in FIG. 2, for selectively connecting an electrical power source, 240/100 VAC, to twelve heating elements, eleven of which operate to individually raise the water temperature flowing through the heater in 5° F. increments, but with the twelfth element being operable to raise the water temperature in two 2° F. increments and one 1° F. increment.

Referring now to FIG. 2, the housing 12 is shown in dashed lines enclosing twelve heater elements 52-1, 52-2 ... 52-11, 52-12. As shown, the heater elements 52-1 through 52-11 are comprised of single element heaters which when energized are adapted to raise the water temperature by 5° F. each. The last or twelfth heater element 52-12, however, is comprised of three individual heater segments or sub-sections a, b, and c, with segments a and b being operable to provide 2° F. temperature increments while segment c is operable to provide a 1° F. temperature increment. Each of the resistive portions of the twelve heater elements 52-1 .. . 52-12 are individually connected across the 240/100 VAC power terminals 54 and 56 by means of fourteen electrical chip relays 58-1 ... 58-14, which are commonly located on a circuit board member 60. The solenoids of the fourteen relays are individually energized by fourteen individual wire leads 62-1 ... 62-14 and a common return lead 62-15 which make up the two fifteen wire cables 48 and 50 connected to the microcomputers 36 and 38 shown in FIG. 1.

Thus a temperature rise capability of 60° F., in incremental temperature control steps of 1° F., can be provided by the arrangement shown in FIG. 2. When desirable, the hot water heater 10 can be modified to include additional 5° F. heater elements in order to increase the temperature rise capability depending upon the needs of the particular installation.

The cold water input valve 16 shown in FIG. 1 is typically a simple two position (on/off) solenoid valve. The delivery or output solenoid valves 20, 26 and 28, however, are of a design which permits different opening settings and accordingly different flow rates, for example, up to six different flow rates being provided in increments of 0.5 gallon per minute (gpm) for each stepped position.

Figure 4:
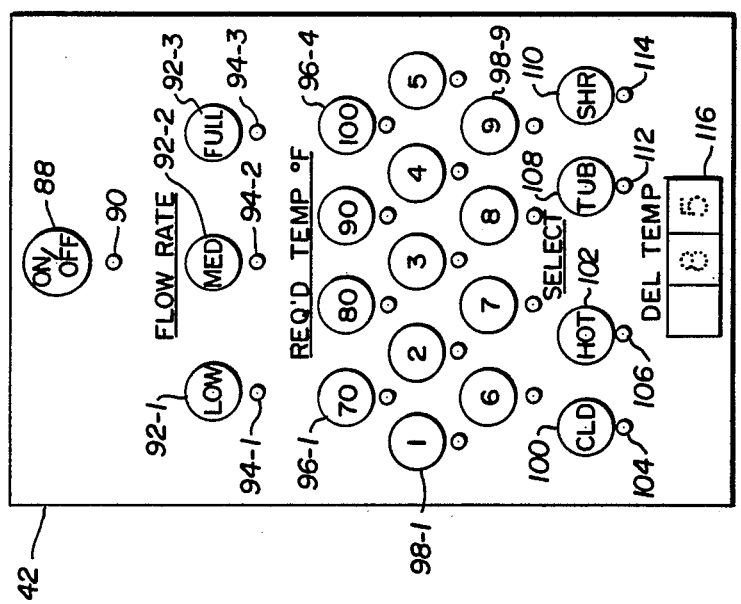
FIGS. 3 and 4 are diagrammatic illustrations of push button control panels for use in a faucet and sink installation and a shower and tub installation, respectively.
Figure 3:
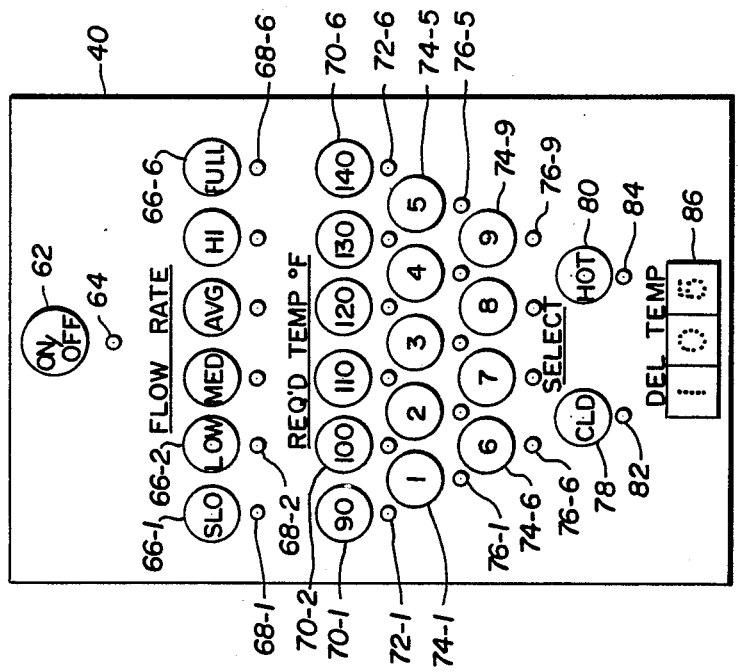

Referring now to FIGS. 3 and 4, FIG. 3 is intended to depict the details of the control panel 40 for use of the system in connection with a hot water delivery system for a kitchen sink, for example, where a relatively full range of flow rates and temperatures is required. Reference numeral 62 is intended to indicate a system on/off push-button 62 with an associated indicator light 64 providing an indication of an "on" condition. Below this, six flow rate push buttons 66-1, 66-2 ... 66-6 are provided for selecting flow rates ranging from "slow" (0.5 gpm) to "full" (3.0 gpm) in 0.5 gpm increments. Respective indicator lights 68-1 through 68-6 are lit as will be explained subsequently. Below the flow rate push buttons are located a set of six 10° F. increment push buttons 70-1, 70-2 ... 70-6 and associated indicator lights 72-1 ... 72-6 as well as a set of nine 1° F. push buttons 74-1, 74-2 ... 74-9 together with their respective indicator lights 76-1 ... 76-9. Beneath the desired temperature push button set are located two push buttons 78 and 80 which together with their respective indicator lights 82 and 84, provide the user with a selection either of "cold" or ambient (unheated) water over a designated flow rate range or "hot" water over both the desired temperature range and flow rate. Below the two selector buttons 78 and 80 is an LED indicator 86 which is controlled by the microcomputer 36 to provide a digital display of the water temperature delivered to the water tap in use.

With respect to the configuration shown in FIG. 4, the control panel 42 for the tub and shower installation is simpler, in some respects, in that it is intended to provide fewer flow rate and temperature options but now includes control push buttons for selecting either a tub or shower head water delivery. Thus as shown, the panel 42 includes an on/off push button switch 88 and its associated indicator light 90. Now, however, only three flow rate push buttons 92-1, 92-2 and 92-3 are included for providing "low" (1.0 gpm), "medium" (1.5 gpm) and "full" (3.0 gpm) outputs to both water taps 30 and 32. Respective indicator lights 94-1 ... 94-3 are associated with the flow rate push buttons 92-1 ... 92-3. Four 10 F range push buttons 96-1, 96-2, 96-3 and 96-4 are provided for selecting temperatures in the range of 70° F., 80° F., 90° F. and 100° F. Additionally, nine 1° F. increment push buttons 98-1, 98-2, ... 98-9 are provided in order to select temperatures within the four 10° F. temperature ranges. As before, associated indicator lights are provided. Hot and cold water select push buttons 100 and 102 and associated indicator lights 104 and 106 are provided as before but now two additional push buttons 108 and 110 are added to provide selectivity between either tub or shower water delivery. Again a LED temperature indicator 116 is provided to show the temperature of the water delivered to either the tub or shower tap 30 and 32.

Figure 5:
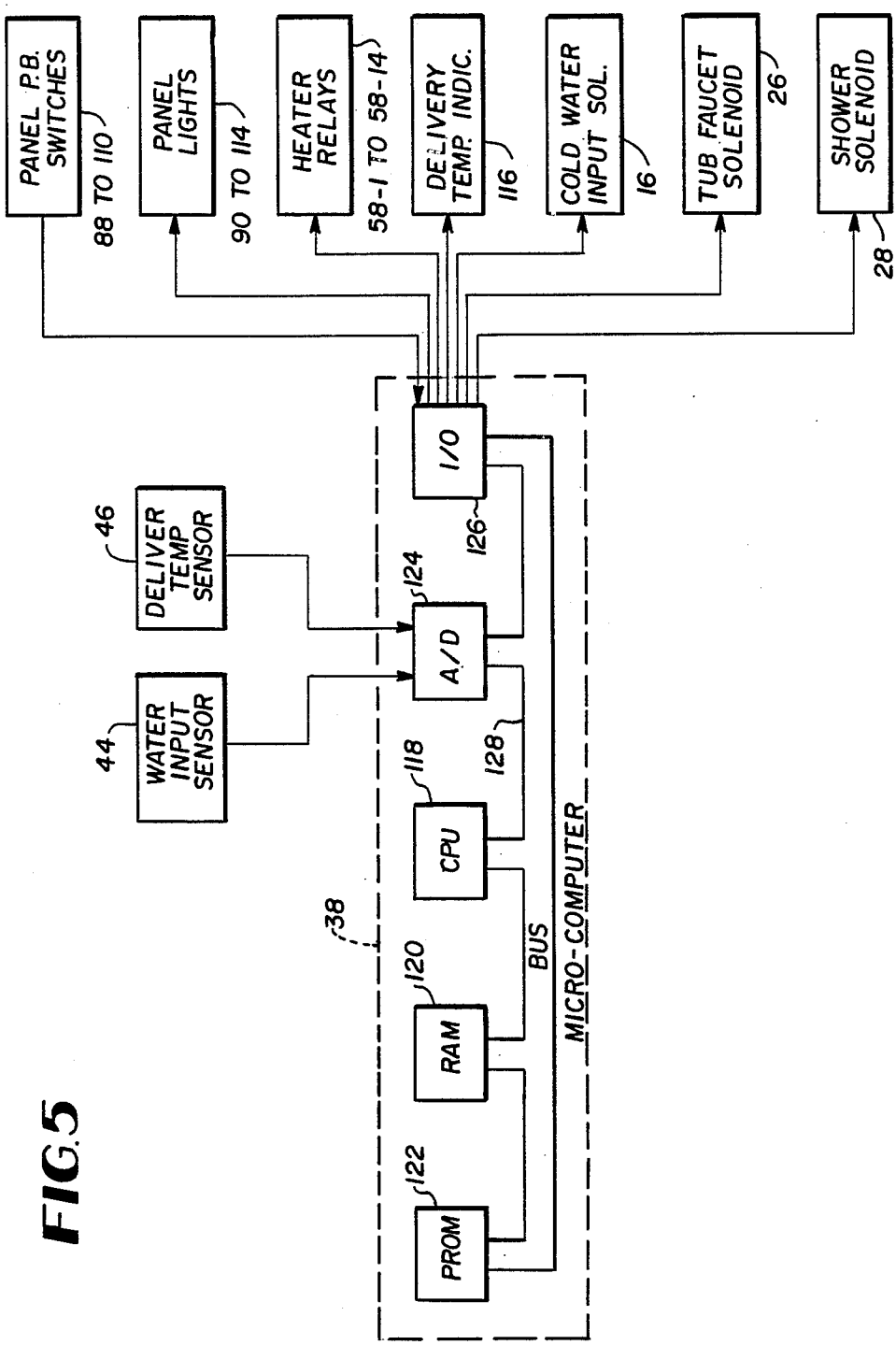
FIG. 5 is an electrical block diagram illustrative of the microcomputer control of the subject invention.

Referring now to FIG. 5, there is disclosed in block diagrammatic form the manner in which a microcomuter in accordance with the subject invention operates to control flow rate and water temperature once user selected inputs provided by the panel push buttons have been entered thereto. FIG. 5 is illustrative of the microcomputer control of the tub and faucet installation because it involves individual control of two separate solenoid output delivery valves 26 and 28 for the tub faucet 30 and the shower head 32, respectively, it being understood, however, that control of the sink output solenoid 20 would be implemented in the same manner with the elimination of one output valve control.

As shown in FIG. 5, the microcomputer 38 includes a central processing unit (CPU) 118, a random access memory (RAM) 120, a programmable read only memory (PROM) 122, an analog to digital (A/D) converter 124, a set of input-output (I/O) ports 126 and an internal digital data bus 128 which interconnects the components together in a well known manner. The A/D converter 124 is coupled to the two water input and delivery temperature sensors 44 and 46 (FIG. 1) and converts the respective analog values into digital form for use by the CPU 18. The I/O ports 126 are coupled to and receive inputs from the panel push button switches 88 through 110 as shown in FIG. 4 while coupling control outputs for energizing the appropriate control panel lights 90 through 114, the heater relays 58-1 through 58-14, the delivery temperature indicator 116, the cold water input solenoid 16 and the tub and shower solenoids 26 and 28. In operation, the user first depresses an on/off push button, for example, one of the push buttons 62 or 88. For purposes of illustration, if one considers the tub shower installation, push button 88 would be activated. The user would then depress one of the flow rate push button 92-1 through 92-3 followed by the desired temperature push button which requires depressing one or more of the push buttons 96-1 ... 96-4 and 98-1 ... 98-9. Next the hot water push button 102 would be selected followed by a depression of either the tub or shower push buttons 108 and 110. If cold or ambient temperature water is desired, the user simply depresses the cold water push button 100 which will lock out any prior activation of the temperature push buttons. In all cases, appropriate indicator lights will be lit and the input solenoid 16 will now be activated for feeding ambient or "cold" water into the heater unit 10.

By activating the on/off push button 88, a start command signal is generated and fed to the microcomputer 38, causing power to be applied to all the electronics. The CPU unit 118 is reset and execution of a stored program contained in the PROM 122 is begun. The CPU 118 picks up the first instruction and sends a command from the I/O ports 126 to the panel 42 illuminating the "on" light 90. For hot water operation, the CPU 118 then monitors the inputs from the front panel 42 generated by user activation of the various push button switches and turns on the appropriate indicator lights, and stores the setting thereof into the RAM 120. With the flow rate and required temperature push buttons activated, the CPU 118 checks the PROM 122 for a valid set up. If a valid set up is indicated, the CPU 118 waits for a "hot" command signal from the PROM 122. If an invalid situation exists, the CPU 118 changes the flow rate along with the button indicator light to a lower but highest possible flow rate for the temperature selected and again waits for a "hot" command signal from the control panel button 102. When the hot command signal is received from the front panel through the I/O input ports 120, the CPU activates input solenoid 16, checks the RAM 120 for the selected flow rate through the I/O ports 126 and then activates the appropriate tub or shower solenoid 26, 28 to permit water to flow at the set rate. Next, the CPU 118 reads the input water temperature from the sensor 44 through the A/D converter 124, reads the output or delivery water temperature via the sensor 46, and calculates the difference between the two and then activates the required number of heater elements 52-1 . . . 52-12 (FIG. 2) through activation of one or more relays 58-1 . . . 58-14 for the selected temperature desired. The CPU 118 also activates the delivery temperature light emitting diodes of the indicator 116 to indicate the temperature of the water delivered. The CPU 118 continually monitors both the input water temperature and the delivery water temperature and varies the turn-on and turn-off of the various heater elements 52-1 . . . 52-12 until the proper water temperature selected is obtained. This operation will continue until such time that the on/off push button 88 is again depressed, at which time all operation terminates with the CPU 118 deactivating the input solenoid 44 as well as all heater relays 58-1 . . . 58-14 and turning off all indicator lights.

If cold water operation is simply desired, the cold water push button 100 from the front panel 42 is activated and the CPU 118 ignores all settings except the flow rate push buttons 92-1 . . . 92-3, in which case the CPU 118 turns on the appropriate tub or shower solenoid 26 or 28 for the flow rate desired until the "off" command is received by the depression of the on/off push button 88.

The same operation exists for delivery of a predetermined flow rate and temperature to the faucet 22 of the sink installation where the microcomputer 36 controls the water heater 10 in exactly the same fashion with flow rate being controlled by activation of the multiposition flow rate solenoid 20.

Having thus shown and described what is at present considered to be the preferred embodiment of the invention, it should be understood that the same has been made by way of illustration and not limitation. Accordingly, all modifications, changes and alterations coming within the spirit and scope of the invention as set forth in the following claims are herein meant to be included:

I claim:

1. A computer controlled electric instant water heating system comprising:
   an electric water heater having water inlet and outlet means and including a first plurality of separately energizable electric resistive heating elements located therein for raising the temperature in discrete equal first valued temperature increments, a second plurality of separately energizable resistive heating elements for raising the temperature in discrete equal second valued temperature increments, and at least one other separately energizable resistive heating element for raising the temperature a discrete third valued temperature increment, said first valued increments being greater than said second valued increments and said third valued temperature increment being less than said second valued increments;
   at least one variable rate delivery valve connected to said outlet means for delivering water at a selected flow rate to a water tap;
   first and second means for respectively sensing the ambient inlet water temperature at said inlet means and the delivery water temperature at said outlet means;
   means for selecting a desired delivery water flow rate at said water tap;
   means for selecting a desired delivery water temperature at said water tap; and
   digital computer means including means responsive to said temperature selecting means and programmed to constantly calculate the difference between the ambient inlet water temperature and the delivery water temperature, means responsive to said calculated temperature difference for electrically energizing at least one of said heating elements to bring the delivery water temperature to the selected delivery temperature, means for controlling display means to display the current delivery temperature, and means responsive to said flow rate selecting means for controlling said variable rate delivery valve to deliver water at the selected delivery rate to said water tap,
   said digital computer means being further programmed to permit water delivery to said water tap only under a predetermined valid set of user selected flow and temperature values and including means responsive to an invalid selection for causing system operation to occur at the closest possible allowable conditions of flow rate and temperature.

2. The heating system as defined by claim 1 and said computer means additionally including means for selecting between either heated or unheated water delivery by said variable rate delivery valve to said water tap and wherein said means for selecting between heated or unheated water delivery is operable to generate a computer command which causes said computer means to be unresponsive to said means for selecting desired delivery water temperature while still being responsive to said means for selecting flow rate.

3. The heating system as defined by claim 1 wherein said first valued temperature increments comprise substantially 5° F. increments, said second valued temperature increments comprise 2° F. increments and said third temperature increment comprises a 1° F. increment.

4. The heating system as defined by claim 1 wherein each of said at least one variable rate delivery valve comprises a solenoid delivery valve and additionally including an input solenoid valve being energizable by said computer means to control the feed of ambient temperature water to said inlet means of the water heater.

5. The heating system as defined by claim 4 and additionally including another solenoid variable rate delivery valve connected to said outlet means in parallel with said at one delivery valve and being controlled by said computer means and further including means coupled to computer means for selecting water delivery from either said at least one delivery valve or said another delivery valve.

6. The heating system as defined by claim 4 wherein said at least one delivery solenoid valve is selectively operable to vary the flow rate in predetermined steps ranging between 0.5 and 3.0 gpm.

* * * * *